Patented Dec. 28, 1937

2,103,879

UNITED STATES PATENT OFFICE 2,103,879

PRODUCTION OF ORGANIC SULPHUR COMPOUNDS

Hanns Ufer, Ludwigshafen-on-the-Rhine, Germany, assignor to I. G. Farbenindustrie Aktiengesellschaft, Frankfort-on-the-Main, Germany No Drawing. Application November 22, 1935, Serial No. 51,081. In Germany December 17, 1934

8 Claims. (Cl. 260—158)

This invention relates to the production of organic sulphur compounds.

I have now found that valuable organic sulphur compounds are obtained by causing vinyl sulphones having the general formula $$R(SO_2-CH=CH_2)_x$$

in which R is a saturated or unsaturated aliphatic radicle containing at least 7 carbon atoms and $x$ is a whole number to react with bisulphites of light metals, such as sodium, potassium or calcium.

The vinyl sulphones employed as starting materials are for example obtainable by reacting the corresponding vinyl sulphides with peroxidic oxidizing agents or hypochlorites under mild conditions.

Among the aliphatic vinyl sulphones which may be used in the present process may be mentioned for example heptyl, dodecyl, octodecyl and oleyl vinyl sulphones. Vinyl sulphones which contain the vinyl sulphone group more than once in the molecule, as for example 1,12-divinyl sulphone octodecane, may be caused to react a corresponding number of times. The vinyl alkyl sulphones may also have branched chains and may contain other atoms or atomic groups, as for example halogen atoms or hydroxyl, alkoxyl, hydroxyalkyl, nitro, amino, sulph-hydryl, carboxyl or sulphonic acid groups.

During the reaction, which is preferably carried out in the presence of solvents or diluents such as water or aqueous alcohol and if desired under pressure, the bisulphite adds onto the vinyl sulphone groups with the formation of sulphonic acid salts.

The compounds obtained according to this invention may be employed in particular as assistants for the textile and related industries.

The following examples will further illustrate how the present invention may be carried out in practice but the invention is not restricted to these examples. The parts are by weight.

Example 1

A mixture of 60 parts of dodecyl vinyl sulphone and 300 parts of a from 38 to 40 per cent solution of sodium bisulphite is stirred for about seven hours at about 100° C. After cooling, the colorless crystal pulp is separated from the mother liquor and crystallized from water. Colorless crystals are obtained the composition of which probably corresponds to the formula $CH_3(CH_2)_{11}SO_2CH_2CH_2SO_3Na$. The new compound dissolves well in water, somewhat in the same way as soap; it is difficulty soluble in cold ethanol and readily soluble in hot ethanol.

Corresponding compounds are obtained with other vinyl alkyl sulphones, as for example with octodecyl or oleyl vinyl sulphone, and the mixtures of vinyl alkyl sulphones such as may be obtained for example from various alcohols of high molecular weight, such as the mixtures of alcohols obtainable by the catalytic hydrogenation of the fatty acids derived from fats or oils of animal or vegetable origin.

Example 2

A mixture of 53 parts of octodecylvinyl sulphone and 100 parts of a 40 per cent aqueous solution of sodium bisulphite is heated for about 4 hours at a temperature of between 80 and 95° C., while vigorously stirring. After cooling the crystals formed are filtered off by suction and pressed onto clay. The crude reaction product thus obtained is purified by washing with ether and then recrystallized from alcohol. Colorless crystals are obtained, the composition of which corresponds to the formula $C_{18}H_{37}SO_2CH_2CH_2SO_3Na$ and which are decomposed when being heated above 225° C.

In the same manner oleyl vinyl sulphone can be reacted with sodium bisulphite. When employing potassium or calcium bisulphite instead of sodium bisulphite the potassium or calcium salts of the said alkyl sulphone ethane sulphonic acids are obtained.

What I claim is:—

1. The process of producing organic sulphur compounds which comprises reacting vinyl sulphones having the general formula $$R(SO_2-CH=CH_2)_x$$

in which R is an aliphatic radicle containing at least 7 carbon atoms and $x$ is a whole number, with bisulphites of light metals selected from the group consisting of sodium, potassium and calcium.

2. The process of producing organic sulphur compounds which comprises reacting vinyl sulphones having the general formula $$R(SO_2-CH=CH_2)_x$$

in which R is an aliphatic radicle containing at least 7 carbon atoms and $x$ is a whole number, with bisulphites of light metals selected from the group consisting of sodium, potassium and calcium in the presence of a diluent selected from the group consisting of water and aqueous alcohol.

3. The process of producing organic sulphur compounds which comprises reacting vinyl sulphones having the general formula $$R(SO_2-CH=CH_2)_x$$

in which R is an aliphatic radicle containing at least 7 carbon atoms and $x$ is a whole number, with bisulphites of light metals selected from the group consisting of sodium, potassium and calcium in the presence of water.

4. The process of producing organic sulphur compounds which comprises reacting vinyl sulphones having the general formula $$R(SO_2-CH=CH_2)_x$$

in which R is an aliphatic radicle containing at least 7 carbon atoms and $x$ is a whole number, with bisulphites of light metals selected from the group consisting of sodium, potassium and calcium in the presence of aqueous alcohol.

5. Alkyl-sulphone-ethyl-sulphonic acid salts of light metals selected from the group consisting of sodium, potassium and calcium, the alkyl group of which contains at least 7 carbon atoms.

6. Dodecyl-sulphone-ethyl-sulphonic acid sodium salt.

7. Octodecyl-sulphone-ethyl-sulphonic acid sodium salt.

8. Oleyl-sulphone-ethylsulphonic acid sodium salt.

HANNS UFER.